United States Patent
Tillmann et al.

(10) Patent No.: US 7,882,495 B2
(45) Date of Patent: Feb. 1, 2011

(54) BOUNDED PROGRAM FAILURE ANALYSIS AND CORRECTION

(75) Inventors: Nikolai Tillmann, Redmond, WA (US); Jonathan Paul de Halleux, Seattle, WA (US); Wolfram Schulte, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 901 days.

(21) Appl. No.: 11/763,312

(22) Filed: Jun. 14, 2007

(65) Prior Publication Data

US 2008/0313602 A1 Dec. 18, 2008

(51) Int. Cl.
G06F 9/44 (2006.01)
(52) U.S. Cl. ...................................... 717/124
(58) Field of Classification Search .................. 717/124
See application file for complete search history.

(56) References Cited

U.S. PATENT DOCUMENTS

| | | | |
|---|---|---|---|
| 5,185,867 A | 2/1993 | Ito | |
| 5,485,601 A | 1/1996 | Ching | |
| 5,940,847 A * | 8/1999 | Fein et al. | 715/236 |
| 6,311,324 B1 | 10/2001 | Smith et al. | |
| 6,336,148 B1 | 1/2002 | Doong et al. | |
| 6,550,024 B1 * | 4/2003 | Pagurek et al. | 714/47 |
| 6,996,798 B2 | 2/2006 | Ali et al. | |
| 2002/0199168 A1 | 12/2002 | Namito | |
| 2004/0003335 A1 | 1/2004 | Gertz et al. | |
| 2004/0210876 A1 * | 10/2004 | Stall et al. | 717/127 |
| 2005/0114842 A1 * | 5/2005 | Fleehart et al. | 717/126 |
| 2005/0132337 A1 * | 6/2005 | Wedel et al. | 717/128 |
| 2006/0005169 A1 * | 1/2006 | Berstis et al. | 717/125 |
| 2007/0033440 A1 | 2/2007 | Tillmann et al. | |
| 2007/0033576 A1 | 2/2007 | Tillmann et al. | |
| 2007/0294597 A1 * | 12/2007 | Kalavacharla et al. | 714/52 |

OTHER PUBLICATIONS

Woodward et al., "Detecting logic errors in discrete-event simulation: reverse engineering through event graphs", Apr. 1996, Elsevier Science.*

Gao et al., "Monitoring Software Components and Component-Based Software", 2000, IEEE.*

(Continued)

*Primary Examiner*—Wei Y Zhen
*Assistant Examiner*—Junchun Wu
(74) *Attorney, Agent, or Firm*—Workman Nydegger (57) ABSTRACT

In one embodiment, a computer system determines that a previously run test scenario configured to test a software program has failed to produce an expected result due to one or more semantic errors, generates error trace code configured to monitor the called component, processes the test scenario using the error trace code, and analyzes error trace information to determine the point at which the semantic error occurs in the called component. In an alternative embodiment, a computer system detects a semantic error in a software component of a software program, constructs an error condition that may include source code representing a minimum condition under which the error occurs, generates an object invariant based on the error condition that represents an opposite condition to that represented by the error condition, and automatically generates source code change recommendations using the object invariant that prevent the semantic error from reoccurring in subsequent test scenarios.

20 Claims, 4 Drawing Sheets

OTHER PUBLICATIONS

Automatic Generation of Program Specifications, Jeremy W. Nimmer and Michael D. Ernst (Article 1).

Automatic Synthesis of Specifications From the Dynamic Observation of Reactive Programs; Bernard Boigelot and Patrice Godefroid, Apr. 1997 (Article 2).

The Daikon System for Dynamic Detection of Likely Invariants, Michael D. Ernst, Jeff H. Perkins, Philip J. Guo, Stephen McCamant, Carlos Pacheco, Matthew S. Tschantz, Chen Xiao Jul. 30, 2006 (Article 3).

* cited by examiner

BOUNDED PROGRAM FAILURE ANALYSIS AND CORRECTION

BACKGROUND

Computers are used all over the world to perform a wide variety of tasks. Computers perform these tasks by executing software code. Software code is typically written by one or more software developers using some type of integrated development environment (IDE). In many cases, developers are given a set of design instructions, and, using a programming language, draft software code that will implement the functions described in the design specifications. Depending on the nature and scope of the design specifications (or any subsequent modifications thereto), code for the software program can often become lengthy and complex. It is well known that complex code is likely to contain software defects, also known as software bugs.

Software bugs can include a wide variety of problems from simple grammatical mistakes routinely detected by software compilers to semantic problems that are often very difficult to debug. Often, when a semantic problem prevents a software program from functioning correctly, the error is the result of improper inputs received by one software module from another software module or from internal processing within a software module. Most software programs include a plurality of software modules (e.g. functions, methods, classes, etc.), each configured to perform functions that often involve using other software modules. These modules work together to produce the desired result of the software program. Thus, if one module is producing faulty outputs, any module that receives those faulty outputs will produce invalid and/or improper results.

In order to perform the desired function, software modules communicate with each other in a manner specified by the program developer. The developer programs into each module certain requirements that are to be followed in order for the module to function correctly. Such requirements can include parameters that specify ranges of expected values that can be received and used as inputs. Alternatively, the requirements can specify range values for outputs that are to be used as inputs in other modules.

In cases where modules receive program values outside of the specified range, a violation typically occurs, causing the module to function incorrectly. Similarly, even if the module receives values within the expected range, if the module has an internal error, it may process the received values incorrectly and output values outside of those specified in the module requirements. Thus, the module designed to receive these improperly processed values will similarly result in a program violation, and so on.

Once a developer has determined that a semantic failure has occurred, the developer manually analyzes the software modules to determine where the error has occurred. Systematically, the developer narrows down the modules involved in the failed execution and determines which module(s) caused the failure. Next, the developer attempt to determine what in the module actually caused the failure. Then, the developer can determine how to fix the failure so that the failure does not occur on subsequent program executions. Such analysis, however, is often a time-consuming and lengthy process.

BRIEF SUMMARY

Embodiments of the present invention are directed to automatically determining the point at which a semantic error occurs in a software component of a software program using an error trace. In one embodiment, a computer system performs a method for automatically determining the point at which a semantic error occurs in a software component of a software program using an error trace corresponding to a single component of the software program. A computer system determines that a previously run test scenario configured to test a software program has failed to produce an expected result due to one or more semantic errors. The software program includes at least one calling component and at least one called component. The calling component is configured to call the called component, and the call may include one or more values to be used by the called component as inputs.

Based on the computer system's determination, the computer system generates error trace code configured to monitor the called component. The monitoring includes identifying input values received in the call from the calling component and return values generated by the called component. The error trace code includes a plurality of checks configured to detect unexpected result values for each software component. The computer system processes the test scenario using the error trace code. The error trace code detects unexpected result values at the called component. The unexpected result values indicate a violation of specified allowable behavior for the called component. The computer system analyzes error trace information provided by each of the plurality of checks of the error trace to determine the point at which the semantic error occurs in the called component.

Additionally or alternatively, in another embodiment, a computer system automatically generates source code change recommendations for a software component that prevents one or more detected semantic errors from reoccurring in subsequent test scenarios. The computer system detects a semantic error in a software component of a software program during the processing of a test scenario. The computer system constructs an error condition that includes source code representing a minimum condition under which the error occurs. The computer system generates an object invariant based on the error condition that represents an opposite condition that is the opposite of the condition represented by the error condition. The computer system automatically generates source code change recommendations using the object invariant that prevent the semantic error from reoccurring in subsequent test scenarios.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to automatically determining the point at which a semantic error occurs in a software component of a software program using an error trace. In one embodiment, a computer system performs a method for automatically determining the point at which a semantic error occurs in a software component of a software program using an error trace corresponding to a single component of the software program. A computer system determines that a previously run test scenario configured to test a software program has failed to produce an expected result due to one or more semantic errors. The software program includes at least one calling component and at least one called component. The calling component is configured to call the called component, and the call includes one or more values to be used by the called component as inputs.

Based on the computer system's determination, the computer system generates error trace code configured to monitor the called component. The monitoring includes identifying input values received in the call from the calling component, recording the operations performed, monitoring the reading and writing of values to and from the component's state, and monitoring the return values generated by the called component. The error trace code includes a plurality of checks configured to detect unexpected result values for each software component. The computer system processes the test scenario using the error trace code. The error trace code detects unexpected result values at the called component. The unexpected result values indicate a violation of specified allowable behavior for the called component. The computer system analyzes error trace information provided by each of the plurality of checks of the error trace to determine the point at which the semantic error occurs in the called component.

Additionally or alternatively, in another embodiment, a computer system automatically generates source code change recommendations for a software component that prevents one or more detected semantic errors from reoccurring in subsequent test scenarios. In some cases, the computer system may also modify the compiled software component instead of recommending software changes. The computer system detects a semantic error in a software component of a software program during the processing of a test scenario. The computer system constructs an error condition that includes source code representing a minimum condition under which the error occurs. The computer system generates an object invariant based on the error condition that represents an opposite condition that is the opposite of the condition represented by the error condition. The computer system automatically generates source code change recommendations using the object invariant that prevent the semantic error from reoccurring in subsequent test scenarios. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
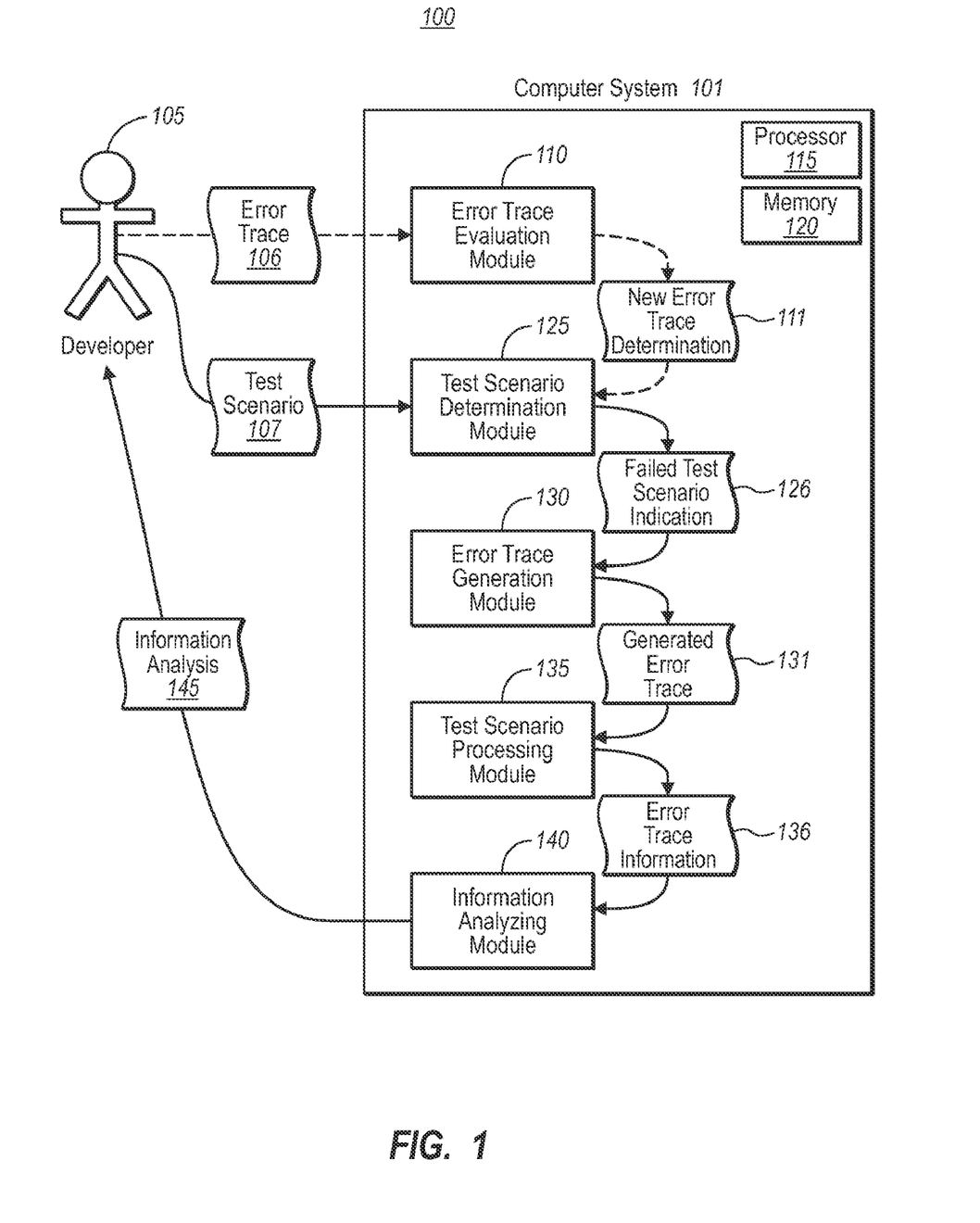
FIG. 1 illustrates a computer architecture in which embodiments of the present invention may operate including automatically determining the point at which a semantic error occurs in a software component of a software program.

FIG. 1 illustrates a computer architecture 100 in which the principles of the present invention may be employed. Computer architecture 100 includes computer system 101. In some embodiments, computer system 101 includes processor 115 and memory 120. Processor 115 may be any type of chip or processing device capable of processing electronic inputs. Similarly, memory 120 may be any type of solid state, random access, magnetic, optical or other type of computer memory. Computer system 101 may be configured to receive error trace 106 from a computer user 105. In some cases, computer user 105 may be a software developer.

In some embodiments, error trace evaluation module 110 may receive error trace 106 and make a determination as to whether the error trace is new as compared to other existing error traces. As used herein, an error trace is a portion of software code that monitors the inputs and outputs of each software component within a software program. If error trace evaluation module 110 determines that error trace 106, received from developer 105, is sufficiently different from other, existing error traces, the module 110 will output new error trace determination 111, indicating that the error trace has sufficient novelty to be designated as "new."

Computer system 101 also includes test scenario determination module 125. Similar to error trace 106, test scenario 107 may be drafted and/or input by software developer 105. Test scenario determination module 125 may be configured to receive test scenario 107 and make a determination as to whether the test scenario passed or failed. As used herein, a test scenario may be any type of test case or test run where one or more portions of software code are tested for expected functionality. For example, if a given portion of software code is supposed to open a dialog box in a graphical user interface (GUI), the test scenario will test whether the dialog box opened as expected. If the box opened as expected, the test scenario will designate the test as "passed" and if the dialog box failed to open as expected, the test scenario will designate the test as "failed." Thus, test scenario determination module 125 may be configured to determine whether test scenario 107 passes (i.e. produces the correct, expected outputs) or fails (i.e. produces incorrect, unexpected outputs). If test scenario 107 fails, test scenario determination module 125 indicates this failure in failed test scenario indication 126.

In some embodiments, error trace generation module 130 may be configured to receive failed test scenario indication 126. Error trace generation module 130 may be configured to generate an error trace. This generated error trace 131 may be similar to error trace 106 or may be entirely different. Error trace generation module 130 may be configured to generate error trace 131 automatically. In some cases, this automatic generation may occur upon receiving failed test scenario indication 126. Test scenario processing module 135 may be configured to receive generated error trace 131. In some embodiments, test scenario processing module 135 may be configured to process test scenario 107 while incorporating generated error trace 131. Thus, as will be explained in greater detail below, test scenario 107 may be processed along with the error trace 131 in order to monitor the inputs and outputs at each point during the execution of the test scenario. The information gathered during the monitoring may be designated as error trace information 136.

Error trace information 136 may include all types of information about the inner workings of the test scenario, including, in some cases, the inner workings of the software being tested. For example, error trace information 136 may include a list of all inputs, outputs, calculations, pointers, variable values, stacks, arrays, method calls, or any other information useful in analyzing each step of the execution of the test scenario. This error trace information 136 may be analyzed by information analyzing module 140. Analyses performed by information analyzing module 140 may include comparing expected inputs and received inputs, expected outputs and actual outputs, expected method calls and actual method calls, or simply determining whether processing order was correct. Such an analysis is designed to determine the cause of the failure indicated by failed test scenario indication 126.

The resulting information analysis 145 may be sent to developer 105. The information analysis 145 may include any type of information helpful to the developer in determining the cause of the failure. Analysis 145 may be a detailed, line-by-line procedural map of each execution that took place or may be a more generalized analysis. In some cases, the developer can specify which elements the error trace is to track, how the error trace information is analyzed and how the information analysis 145 is presented to the user.

Figure 2:
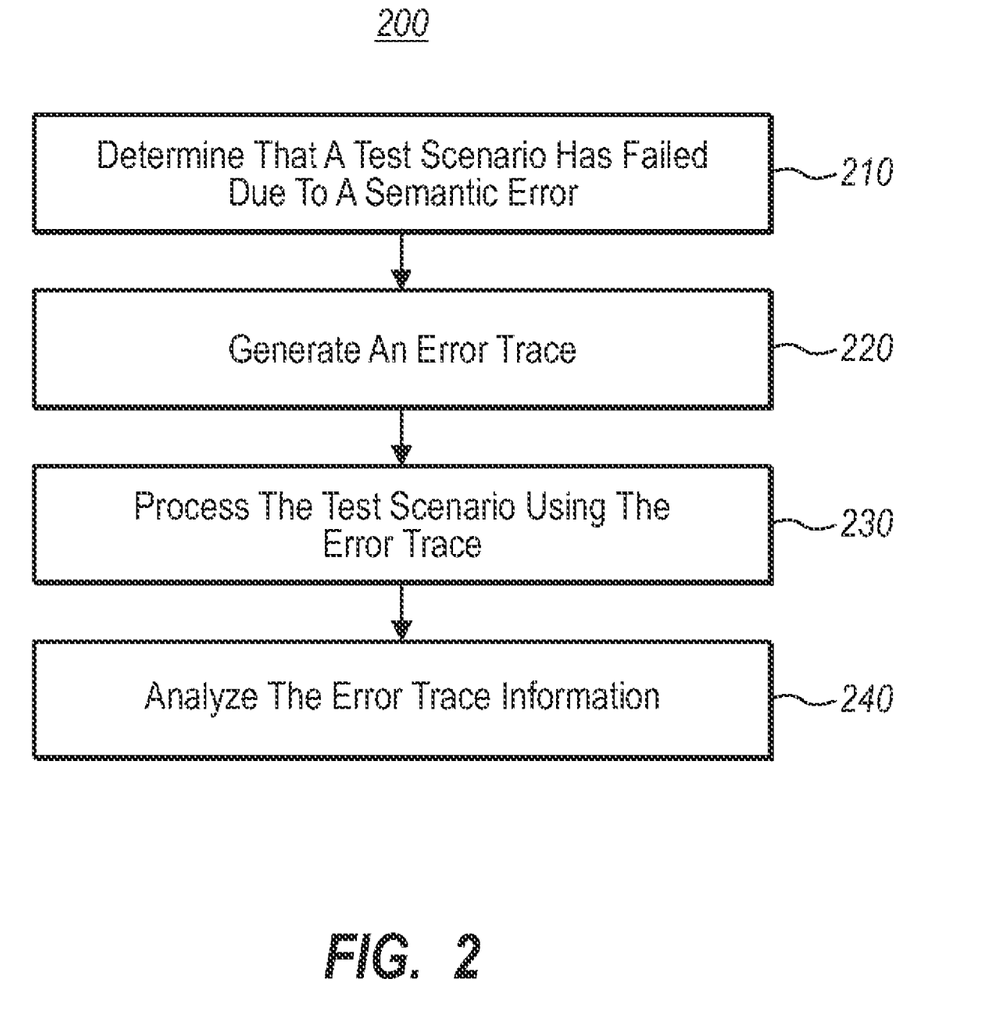
FIG. 2 illustrates a flowchart of an example method for automatically determining the point at which a semantic error occurs in a software component of a software program.

FIG. 2 illustrates a flowchart of a method 200 for automatically determining the point at which a semantic error occurs in a software component of a software program using an error trace corresponding to a single component of the software program. The method 200 will now be described with frequent reference to the components and data of environment 100.

Method 200 includes an act of determining that a previously run test scenario configured to test a software program has failed to produce an expected result due to one or more semantic errors where the software program includes at least one calling component and at least one called component and where the calling component is configured to call the called component, the call including one or more values to be used by the called component as inputs (act 210). For example, test scenario determination module 125 may determine that a previously run test scenario configured to test a software program has failed to produce an expected result due to one or more semantic errors (e.g. failed test scenario indication 126). In other embodiments, semantic errors may be detected on a computer system currently being used by a computer user, rather than during a separate test scenario. In such cases, the software program being used by the user may have crashed due to expected results stemming from one or more semantic errors. The software program (not shown) may include at least one calling component and at least one called component. The calling component may be configured to call the called component. The call may include one or more values to be used by the called component as inputs.

Semantic errors, as the term is used herein, imply errors with inputs, outputs, processing and core functionality, and have less to do with mere typographical or syntactical errors. Semantic errors represent problems with the way inputs are received and processes and not whether each line of code has a semicolon. In some cases, the semantic error occurs because one or more of the supplied inputs is an improper input that, when executed, results in an invalid process. For example, if the code included a mathematical division operation, and the input to the denominator was 0, the result of the division operation would be an invalid divide-by-zero process. In this example, the value 0 may come as an input to the function, or may be the result of a process that had faulty inputs that led to a 0 being used as the denominator.

In some embodiments, a check may be added to error trace 131 to verify that improper inputs resulted from improper processing by the calling component. As in the previous example, the 0 value in the denominator of a called component may result from improper processing by a calling component. In other words, outputs from the calling component used as inputs by the called component result in a 0 value being in the denominator. Checks in the error trace may be added to prevent this situation.

Method 200 also includes, based on the determination in act 210, an act of generating error trace code configured to monitor the called component where the monitoring includes identifying input values received in the call from the calling component and return values generated by the called component and where the error trace code comprises a plurality of checks configured to detect unexpected result values for each software component (act 220). For example, based on failed test scenario indication 126, error trace generation module 130 may generate error trace code 131 configured to monitor a called component. The monitoring may include identifying input values received in the call from the calling component and return values generated by the called component. The error trace code 131 may include a plurality of checks configured to detect unexpected result values for each software component.

In some embodiments, error trace 131 may expand one or more nested calls within the called component in order to show all call and return sequences within the component. As explained above, software applications with multiple components may be tested in test scenario 107. Error trace 131 may be configured to expand nested calls within a called component of a software program. Within this component, all call and return values and parameters may be monitored. In some cases, error trace 131 is configured to track inputs and outputs of the called component such that each processing step is reproduceable. Thus, the error trace code can be used not only to determine where a semantic error has occurred, but can also be used to recreate or reproduce an entire sequence of executions including inputs, intermediate values, and outputs. In other embodiments, error trace evaluation module may determine that error trace 106 is the same as at least one previously created error trace used with the called component. In some cases, when error trace evaluation module 110 makes such a determination, error trace 106 may be discarded. In other cases, if it is determined that error trace 106 is similar to at least one previously created error trace, error trace 106 may be discarded.

Method 200 also includes an act of processing the test scenario using the error trace code where the error trace code detects unexpected result values at the called component and the unexpected result values indicate a violation of specified allowable behavior for the called component (act 230). For example, test scenario processing module 135 may process test scenario 107 using generated error trace code 131. Error trace code 131 may detect unexpected result values at a called component and the unexpected result valued may indicate a violation of specified allowable behavior for the called component.

In some cases, error trace information 136 provided by each of the plurality of checks of the error trace 131 may comprise argument values. In other cases, error trace information 136 provided by each of the plurality of checks of the error trace 131 may comprise normal result values. As explained above, error trace information 136 may include any type of values useful in determining the point at which a semantic error occurs in a software program or component. This may include argument values, normal or expected result values, inputs, outputs, parameters, variable values or any other information that may be gleaned from monitoring the processing of a software program.

Method 200 also includes an act of analyzing error trace information provided by each of the plurality of checks of the error trace to determine the point at which the semantic error occurs in the called component (act 240). For example, information analyzing module 140 may be configured to analyze error trace information 136 provided by each of the plurality of checks of the error trace 131 to determine the point at which the semantic error occurs in the called component. Information analyzing module 140 may analyze the error trace information 136 according to a manner specified by developer 105.

Or, alternatively, information analyzing module 140 may be configured to analyze error trace information 136 in a pre-programmed fashion, programmed by someone other than developer 105. In some embodiments, developer 105 may be able to further specify how and in what format information analysis 145 is generated. Furthermore, developer 105 may be able to specify how information analysis 145 is sent from information analyzing module 140. For example, information analysis 145 may be displayed on a computer monitor attached to computer system 101 (not shown), may be electronically transmitted to a remote location, may be printed and mailed, or any other means of sending the information.

Figure 3:
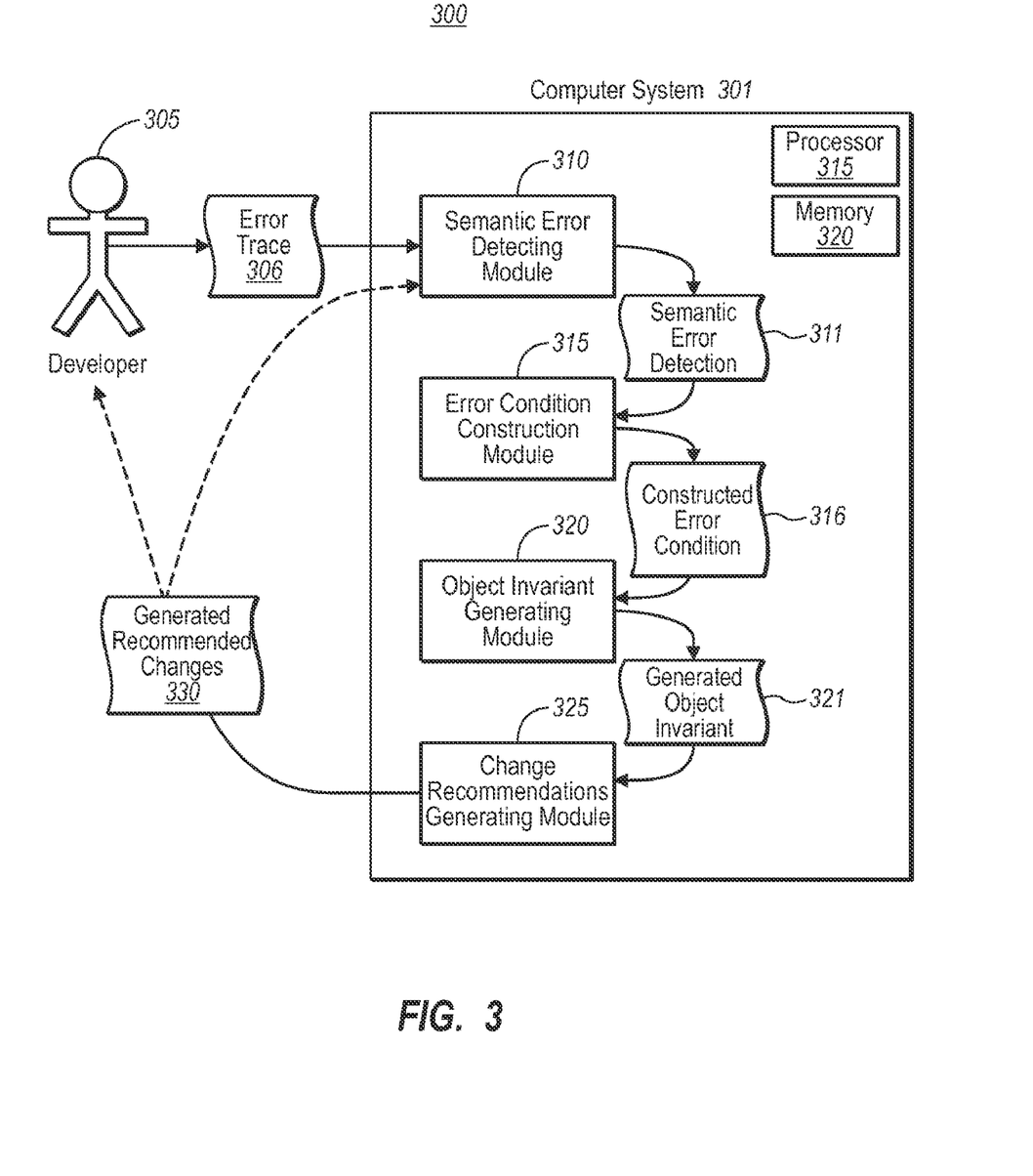
FIG. 3 illustrates an alternative computer architecture in which embodiments of the present invention may operate including automatically generating source code change recommendations for a software component that prevents one or more detected semantic errors from reoccurring in subsequent test scenarios.

FIG. 3 illustrates an alternative computer architecture 300 in which the principles of the present invention may be employed. Computer architecture 300 includes computer system 301. In some embodiments, computer system 101 may include processor 315 and memory 320. Processor 315 and memory 320 are substantially similar to processor 115 and memory 120 of FIG. 1 and will thus not be described in detail here. Computer system 301 includes semantic error detecting module 310. In some embodiments, semantic error detecting module 315 may be configured to receive error trace 306 and detect semantic errors in a software program during the processing of a test scenario. If semantic errors are detected, semantic error detection notification 311 is sent to error condition construction module 315, notifying the module 315 of where semantic errors occurred in the software component.

Based on the received semantic error detection, error condition construction module 315 may be configured to construct an error condition 316. Constructed error condition 316 may be a portion of software code that represents a minimum condition under which the error occurs. This condition may be derived directly from the program code, or the source code may be synthesized from data associated with the error trace 306. In some cases, the condition can be derived from unfolded source code, for example, with loops unfolded an appropriate number of times. In one example, if a code portion begins with two if statements such as the following: if (x==5) {if (y==7) { . . . } else { . . . } error; } where the embedded semantic error occurs every time x==5, the minimum condition under which the error will occur is when x==5, regardless of the value of y. Although this is a simplified example, it illustrates one way in which the minimum condition may be found under which the semantic error will occur by analyzing the control-flow dependencies of the program code.

Object invariant generating module 320 may be configured to generate an object invariant based on the received error condition 316. An object invariant, simply stated, is the opposite of the error condition, if the error condition refers, at least in part, to the state of the module. The state of the module persists in between method calls. An object invariant is a condition that, if met, will prevent the semantic error from occurring. For example, looking again at the code portion above, if the error condition is x==5 and x is a property of the module or object, then the object invariant in that case would be x≠5. Thus, in this case, using a generated object invariant of x≠5 ensures that the minimum condition under which the semantic error occurs (here, x==5) will not occur because x cannot be 5.

Change recommendations generating module 325 may be configured to receive generated object invariant 321 and make code change recommendations based on the object invariant. For instance, continuing the above example, change recommendations generating module 325 may recommend that the software code be changed such that x cannot equal 5 (as represented by the object invariant 321). Thus, on a subsequent processing of the test scenario by semantic error determination module 310, the semantic error that occurred because x was equal to 5 will not occur, at least for that reason (although other code may trigger the same semantic error). Thus, through each iterative process, the incremental recommended changes 330 may be automatically applied to the software component code, upon which the component code may be retested in a test scenario. Additionally or alternatively, generated recommended changes 330 may be sent to developer 305 such that the developer may use the recommended changes 330 to manually alter the software component code to prevent the semantic error from occurring during subsequent processing of test scenarios.

Figure 4:
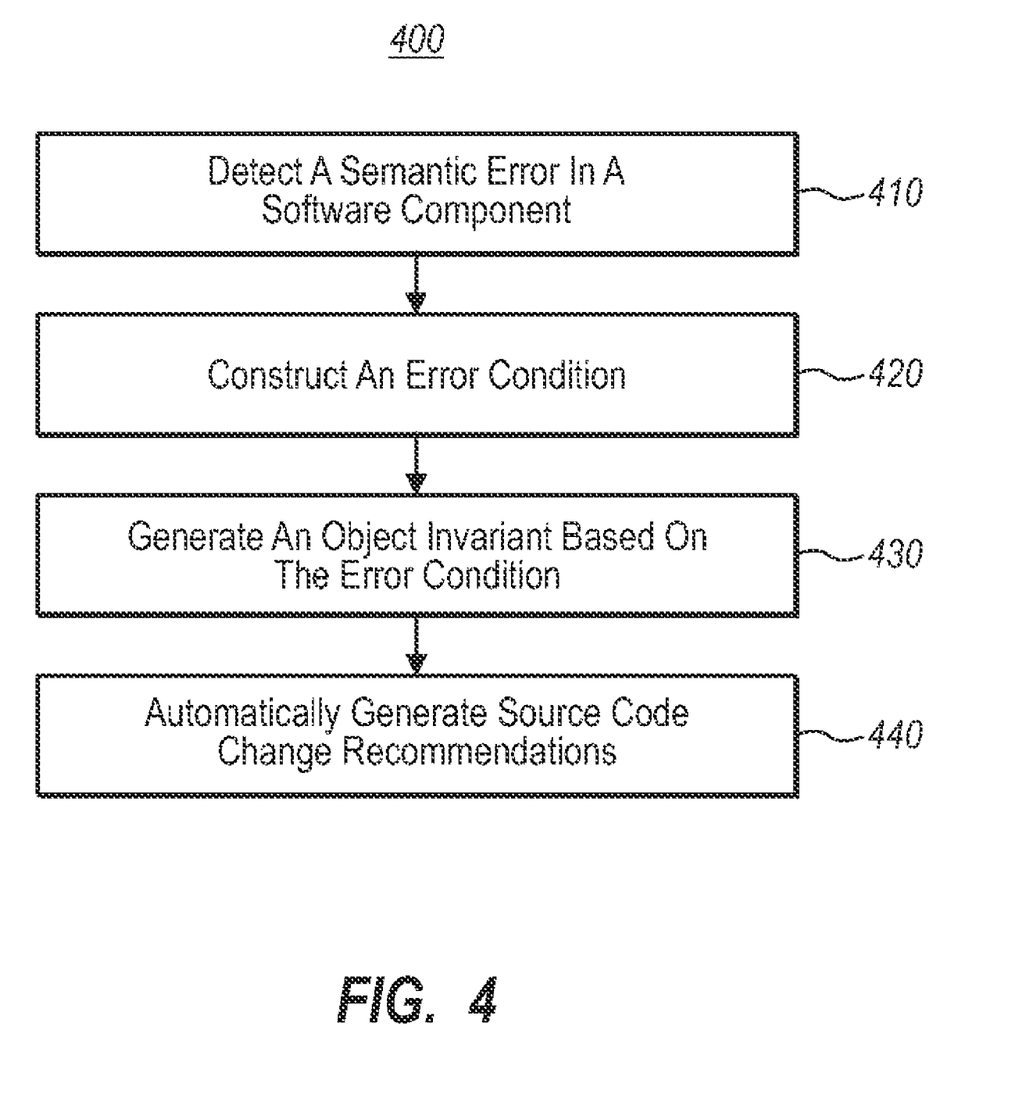
FIG. 4 illustrates a flowchart of an example method for automatically generating source code change recommendations for a software component that prevents one or more detected semantic errors from reoccurring in subsequent test scenarios.

FIG. 4 illustrates a flowchart of a method 400 for automatically generating source code change recommendations for a software component that prevents one or more detected semantic errors from reoccurring in subsequent test scenarios. The method 400 will now be described with frequent reference to the components and data of environment 300.

Method 400 includes an act of detecting a semantic error in a software component of a software program during the processing of a test scenario (act 410). For example, semantic error detecting module 310 may detect a semantic error in a software component of a software program during the processing of a test scenario. The semantic error may be detected using an error trace 306. As explained above, error trace 306 may be used to monitor every code portion that has been executed within the software component and/or the order in which the portions were executed. Error trace 306 can determine which values were part of the parameters when a call happened and which were returned when the call finished.

In some embodiments, one or more software components of the software program interact via public data fields, or shared memory. Such interactions create information that may be used to determine how the components interacted. The settings of such public data fields may be tracked to identify semantic errors and/or their causes in one or more software components of the software program.

Method 400 also includes an act of constructing an error condition, the error condition comprising source code representing a minimum condition under which the error occurs (act 420). For example, error condition construction module 315 may construct an error condition that comprises source code representing a minimum condition under which the semantic error occurs. As explained above with regard to FIG. 3, error condition 316 may represent a minimum condition in a component's code that, when executed, will cause the semantic error to occur. In some cases, error condition 316 may be directly derived from the source code instructions executed when the code is running. Thus, during execution of the code in the software component, it may be determined that, as in the example above, x==5 is the minimum condition under which the semantic error will occur. Often, in real life implementations, the error condition is much more complex than x==5. In such cases, error condition 316 may be an approximation of how the error is reproduced. The approximation may be specific enough to include the condition under which the error occurs, but not so complex that generating an object invariant based on the error condition is prohibitively complex.

Method 400 also includes an act of generating an object invariant based on the error condition where the object invariant represents an opposite condition that is the opposite of the condition represented by the error condition (act 430). For example, object invariant generating module 320 may generate an object invariant 321 based on error condition 316 that represents an opposite condition that is the opposite of the condition represented by error condition 316. The purpose of generating an object invariant may be more obvious when viewed abstractly. Once a semantic error in a software component has been identified, a more specific error condition may be constructed. Once the error can be reproduced using the error condition, it would be advantageous to know one or more conditions under which the semantic error will not occur and change the component code according to these known conditions. These conditions are referred to as object invariants. Such object invariants may be the basis of recommended component code changes, as will be explained below.

Method 400 also includes an act of automatically generating source code change recommendations using the object invariant that prevents the semantic error from reoccurring in subsequent test scenarios (act 440). For example, change recommendations generating module 325 may automatically generate source code change recommendations using generated object invariant 321 that prevent the semantic error from reoccurring in subsequent test scenarios. In some cases, these change recommendations 330 may be automatically applied to the software component. In such cases, semantic error detection module 310 may determine that a different semantic error occurs in the software component that includes the automatically applied source code change recommendations when tested. Based on this determination, error trace 306 may be generated to monitor the software component. In some cases, this error trace 306 is an updated or newer version of a previously used error trace that was used to detect the original semantic error that led to change recommendations 325.

In other cases, the generated source code change recommendations 330 may be presented to a software developer for application to the software component. Thus, the developer 305 would be able to apply the recommended changes 330 as he or she deemed necessary. Some changes could be discarded, others applied and others modified, and then applied. Furthermore, the developer may be allowed to specify how the recommended changes are to be presented. The developer may specify the format and/or style in which the recommended changes are presented such as lists, diagrams, in-line changes next to each line of code, or any other format useful to the developer.

Thus, using embodiments as described herein, the point at which a semantic error occurs in a software component of a software program may be automatically determined using an error trace corresponding to a single component of the software program. Furthermore, source code change recommendations for a software component may be automatically generated that prevent one or more detected semantic errors from reoccurring in subsequent test scenarios.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system, a method for automatically determining the point at which a semantic error occurs in a software component of a software program using an error trace corresponding to a single component of the software program, the method comprising:

an act of determining that a previously run test scenario configured to test a software program has failed to produce an expected result due to one or more semantic errors, the software program including at least one calling component and at least one called component, the calling component configured to call the called component, the call including one or more values to be used by the called component as inputs;

based on the determination, an act of generating error trace code configured to monitor the called component, the monitoring including identifying input values received in the call from the calling component and return values generated by the called component, the error trace code comprising a plurality of checks configured to detect unexpected result values for each software component;

an act of processing the test scenario using the error trace code, the error trace code detecting unexpected result values at the called component, the unexpected result values indicating a violation of specified allowable behavior for the called component; and an act of analyzing error trace information provided by each of the plurality of checks of the error trace to determine the point at which the semantic error occurs in the called component.

2. The method of claim 1, wherein the error trace expands one or more nested calls within the called component in order to show all call and return sequences within the component.

3. The method of claim 1, further comprising:
an act of determining that the error trace is the same as at least one previously created error trace used with the called component; and
based on the determination, an act of discarding the error trace.

4. The method of claim 1, wherein the semantic error occurs because one or more of the supplied inputs is an improper input that, when executed, results in an invalid process.

5. The method of claim 4, further comprising an act of adding a check to the error trace to verify that the improper inputs resulted from improper processing by the calling component.

6. The method of claim 1, wherein the error trace information provided by each of the plurality of checks of the error trace comprises argument values.

7. The method of claim 1, wherein the error trace information provided by each of the plurality of checks of the error trace comprises normal result values.

8. The method of claim 1, wherein the error trace is configured to track inputs and outputs of the called component such that each processing step is reproduceable.

9. At a computer system, a method for automatically generating source code change recommendations for a software component that prevents one or more detected semantic errors from reoccurring in subsequent test scenarios, the method comprising:
an act of detecting a semantic error in a software component of a software program during the processing of a test scenario;
an act of constructing an error condition, the error condition comprising source code representing a minimum condition under which the semantic error occurs;
an act of generating an object invariant based on the error condition, the object invariant representing an opposite condition that is the opposite of the condition represented by the error condition; and
an act of automatically generating source code change recommendations using the object invariant that prevent the semantic error from reoccurring in subsequent test scenarios.

10. The method of claim 9, further comprising an act of automatically applying the generated source code change recommendations to the software component.

11. The method of claim 10, further comprising:
an act of determining that a different semantic error occurs in the software component that includes the automatically applied source code change recommendations; and
based on the determination, an act of generating an error trace configured to monitor the software component.

12. The method of claim 9, further comprising an act of presenting the generated source code change recommendations to a software developer for application to the software component.

13. The method of claim 12, further comprising an act of allowing the software developer to specify how the recommended changes are to be presented.

14. The method of claim 9, wherein the error condition is directly derived from the source code instructions executed when the code is running.

15. The method of claim 9, wherein the error condition is an approximation of how the error is reproduced.

16. The method of claim 9, wherein one or more software components of the software program interact via public data fields.

17. The method of claim 16, further comprising an act of tracking settings of the public fields to identify semantic errors in a software component of the software program.

18. A computer program product for implementing a method for automatically generating source code change recommendations for a software component that prevents one or more detected semantic errors from reoccurring in subsequent test scenarios, the computer program product comprising one or more physical computer-readable media having thereon computer-executable instructions that, when executed by one or more processors of the computing system, cause the computing system to perform the method, the method comprising:
an act of detecting a semantic error in a software component of a software program during the processing of a test scenario;
an act of constructing an error condition, the error condition comprising source code representing a minimum condition under which the error occurs;
an act of generating an object invariant based on the error condition, the object invariant representing an opposite condition that is the opposite of the condition represented by the error condition; and
an act of automatically generating source code change recommendations using the object invariant that prevents the semantic error from reoccurring in subsequent test scenarios.

19. The method implemented by the computer program product of claim 18, further comprising an act of automatically applying the generated source code change recommendations to the software component.

20. The method implemented by computer program product of claim 18, further comprising an act of presenting the generated source code change recommendations to a software developer for application to the software component.

* * * * *